United States Patent [19]

Lamb, Jr. et al.

[11] Patent Number: 5,680,214
[45] Date of Patent: Oct. 21, 1997

[54] HORIZONTAL-POST/VERTICAL-FLEXURE ARRANGEMENT FOR SUPPORTING LARGE REFERENCE OPTICS IN PHASE-SHIFTING SCANNING

[75] Inventors: Joseph A. Lamb, Jr.; James V. Semrad, both of Tucson, Ariz.

[73] Assignee: Wyko Corporation, Tucson, Ariz.

[21] Appl. No.: 620,927

[22] Filed: Mar. 22, 1996

[51] Int. Cl.⁶ .................................................. G01B 9/02
[52] U.S. Cl. .................................... 356/359; 356/346
[58] Field of Search ............................. 356/345, 346, 356/358, 359, 360

[56] References Cited

U.S. PATENT DOCUMENTS

| | | | |
|---|---|---|---|
| 4,844,614 | 7/1989 | Henderson et al. | 356/346 |
| 4,884,003 | 11/1989 | Hayes | 310/328 |
| 5,239,361 | 8/1993 | Burch | 356/346 |
| 5,473,434 | 12/1995 | De Groot | 356/359 |
| 5,481,359 | 1/1996 | Barker | 356/345 |

Primary Examiner—Frank G. Font
Assistant Examiner—Robert Kim
Attorney, Agent, or Firm—Antonio R. Durando

[57] ABSTRACT

A scanning phase-shifting mechanism comprising reference optics supported by three independent supporting members disposed in fixed triangular relation in a plane substantially normal to the optical axis of the instrument. Two upper members support all of the weight of the optics and provide a preferably horizontal, first axis of rotation for adjustment of the tip of the optics in relation to the optical axis of the instrument. The lower member does not support any of the weight of the optics, providing instead only longitudinal support to cause motion during translation. In addition, in conjunction with at least one of the upper members, the lower member provides a second axis of rotation, preferably orthogonal to the first axis, for adjustment of the tilt of the optics. Each supporting member is rigidly connected to a first end of a cantilevered flexure which is anchored at the other end to a stationary support structure housing the micromotion-translation mechanism of the phase-shifting interferometer. A piezoelectric element couples the support structure with the first end of each flexure.

33 Claims, 6 Drawing Sheets

HORIZONTAL-POST/VERTICAL-FLEXURE ARRANGEMENT FOR SUPPORTING LARGE REFERENCE OPTICS IN PHASE-SHIFTING SCANNING

BACKGROUND OF THE INVENTION

1. Field of the Invention

This invention pertains in general to the field of phase-shifting interferometry and, in particular, to a novel mechanism for supporting the reference surface of large-optics phase-shifting interferometers.

2. Description of the Related Art

Optical surface profilers based on phase-shifting interferometry (PSI) utilize phase measurements to calculate surface height values at predetermined points or pixels on a surface under test. The technique is founded on the concept of varying the phase difference between two coherent interfering beams of single wavelength in some known manner, such as by changing the optical path difference (OPD) in discrete steps or linearly with time. Under such conditions, three or more measurements of the light intensity at a pixel of a receiving sensor array can be used to determine the initial phase difference of the light beams at the point on the test surface corresponding to that pixel. Based on such measurements at each pixel of coordinates x and y, a phase distribution map $\Phi(x,y)$ can be determined for the test surface, from which very accurate height data $h(x,y)$ are calculated by methods that are well known in the art.

Phase-shifting interferometry provides a vertical resolution on the order of $1/100$ of a wavelength or better and is widely used for profiling surfaces of similar reflective materials. During the procedure, the reference surface is typically translated with respect to a test surface (or viceversa) over a scanning range of a few microns. This translation must be accomplished in very precise increments and without tip, tilt and/or vibration in the reference surface in order to achieve the precision required to determined phase from optical-path-difference measurements. This requirement is particularly hard to achieve when dealing with interferometers having large optics because the mass of the reference surface increases the difficulty of translating it rapidly, with precision, and without introducing tip, tilt and/or vibrations. Moreover, inasmuch as some micromotion translators are actuated to produce linear translation, large optics also increase the difficulty of maintaining precise linearity of motion.

In addition to the foregoing, instruments designed to measure large surfaces necessarily employ large optics that involve relatively-thin, massive lenses and/or mirrors. Because of their weight, these components tend to suffer deformations when subjected to any force that is not distributed perfectly uniformly throughout the structure. For example, if a large mirror is supported by a transmission flat cell in horizontal position and a vertical micromotion actuator is applied to the cell, the mirror will bend with its center lagging the motion of the cell, thereby introducing unacceptable errors for the purposes of phase-shifting measurements. Therefore, the scanning direction of large-optics PSI interferometers is preferably along a horizontal line, so that the effects of gravity are minimized.

U.S. Pat. No. 4,884,003 (1989) to Hayes, incorporated herein by reference, describes a compact micromotion translator designed to eliminate tilt and vibrations during linear translation of a reference mirror (or, alternatively, of a test surface) over a horizontal scanning range of a few microns. The invention discloses the use of a flexure located between a support plate and the reference mirror and attached to each of them in order to spring load the piezoelectric transducers (PZT) utilized to effect the micromotion of the interferometer. The arrangement disclosed in the patent has proven to be very effective for conventional interferometric apparatus, but has shown some limitations when adapted for use with the massive optics required for certain specialized applications, such as the large reference mirrors used for testing the homogeneity of glass boules. For example, a 24-inch reference mirror typically weighs about 200 pounds; thus, it is easy to see the difficulty involved in translating such a mass with the desired step precision over a scanning distance of at most a few microns.

Specifically, the flexure of the Hayes patent and other prior-art flexures are not well suited for heavy-optics translators because the weight distribution of the reference mirror over the flexure structure is not uniform, which results in tip or tilt and nonlinear motion during translation. This problem is particularly hard to accommodate when dealing with a large reference surface translated along a horizontal axis while disposed vertically against the micromotion mechanism. The vertical position of the optics combined with the thickness of the mechanism fastening them to the flexure produces a torque on the flexure that results in an uneven distribution of the forces opposing the action of the PZT elements utilized for effecting the translation of the reference mirror. In essence, the upper support points for the optics are subject to a force extending the flexure, while the lower support points are subject to a force compressing the flexure. Therefore, tip/tilt perturbations may occur during translation. Accordingly, there still is a need for a translation mechanism capable of moving a large reference mirror with precision and without tip/tilt misalignment or vibrations.

BRIEF SUMMARY OF THE INVENTION

One primary goal of this invention is a PZT translation mechanism suitable for large optics, particularly for reference surfaces greater than 12 inches in diameter and adapted for horizontal motion.

Another important objective is a mechanism that will allow rapid, linear translation of such large optics without introducing tip or tilt in the disposition of the reference surface.

Another goal is a mechanism that will allow rapid, linear translation of such large optics without introducing vibrations in the reference surface.

Still another goal is a mechanism that simplifies the coupling between the PZT translators and the plate supporting the reference mirror.

Finally, another objective is a mechanism that is suitable for direct incorporation with the hardware of existing interferometric surface profilers.

Therefore, according to these and other objectives, the present invention consists of connecting the moving structure that comprises the reference optics of an interferometer to the scanning mechanism by means of three independent supporting members disposed in fixed triangular relation in a plane substantially normal to the optical axis of the instrument. Two upper members support all of the weight of the optics and provide a preferably horizontal, first axis of rotation for adjustment of the tip of the optics (as hereinafter defined) in relation to the optical axis of the instrument. The lower member does not support any of the weight of the optics, providing instead only longitudinal support to cause motion during translation. In addition, in conjunction with at least one of the upper members, the lower member provides a second axis of rotation, preferably orthogonal to the first axis, for adjustment of the tilt of the optics. Each supporting member is rigidly connected to a first end of a cantilevered flexure which is anchored at the other end to a stationary support structure for the micromotion translator of the phase-shifting interferometer. A piezoelectric element couples the support structure with the first end of each flexure. In addition, an adjustment mechanism disposed between the flexure and the reference-surface cell on each supporting member is provided for adjusting the tip-tilt disposition of the reference surface with respect to a predetermined neutral position. Through the action of each flexure, the PZT elements provide a spring-loaded push-pull connection between the stationary portion of the translator and each supporting member so as to distribute uniformly the translation forces applied during scanning.

Because the weight of the optics is placed entirely on the upper supporting members, the flexures of the invention are not subjected to any of the torques that tend to deform the flexures of prior-art devices.

Thus, according to one novel aspect of the invention, the optics of the interferometer are supported only by a pair of horizontal posts, although the scanning translation is provided by imparting a longitudinal force on three, triangularly disposed, points of contact. According to another novel aspect of the invention, each PZT element is acting on the optics through a separate, independent flexure designed to minimize nonuniformity in the force distribution during scanning translations. According to still another new aspect of the invention, tip/tilt adjustment is achieved by two independent adjustment knobs adapted for providing independent rotation about two orthogonal axes.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

The heart of this invention lies in the idea of suspending the optics of a scanning interferometer on two horizontal posts rigidly attached to individual flexures anchored vertically to the support structure for the translator mechanism. The posts bear all weight of the optics of the device. These posts also provide longitudinal support and connection to individual PZT elements for horizontal translation. A third post is similarly rigidly attached to a flexure anchored vertically to the support structure but bears none of the optics' weight, its function being exclusively to provide longitudinal support and translation.

Figure 1:
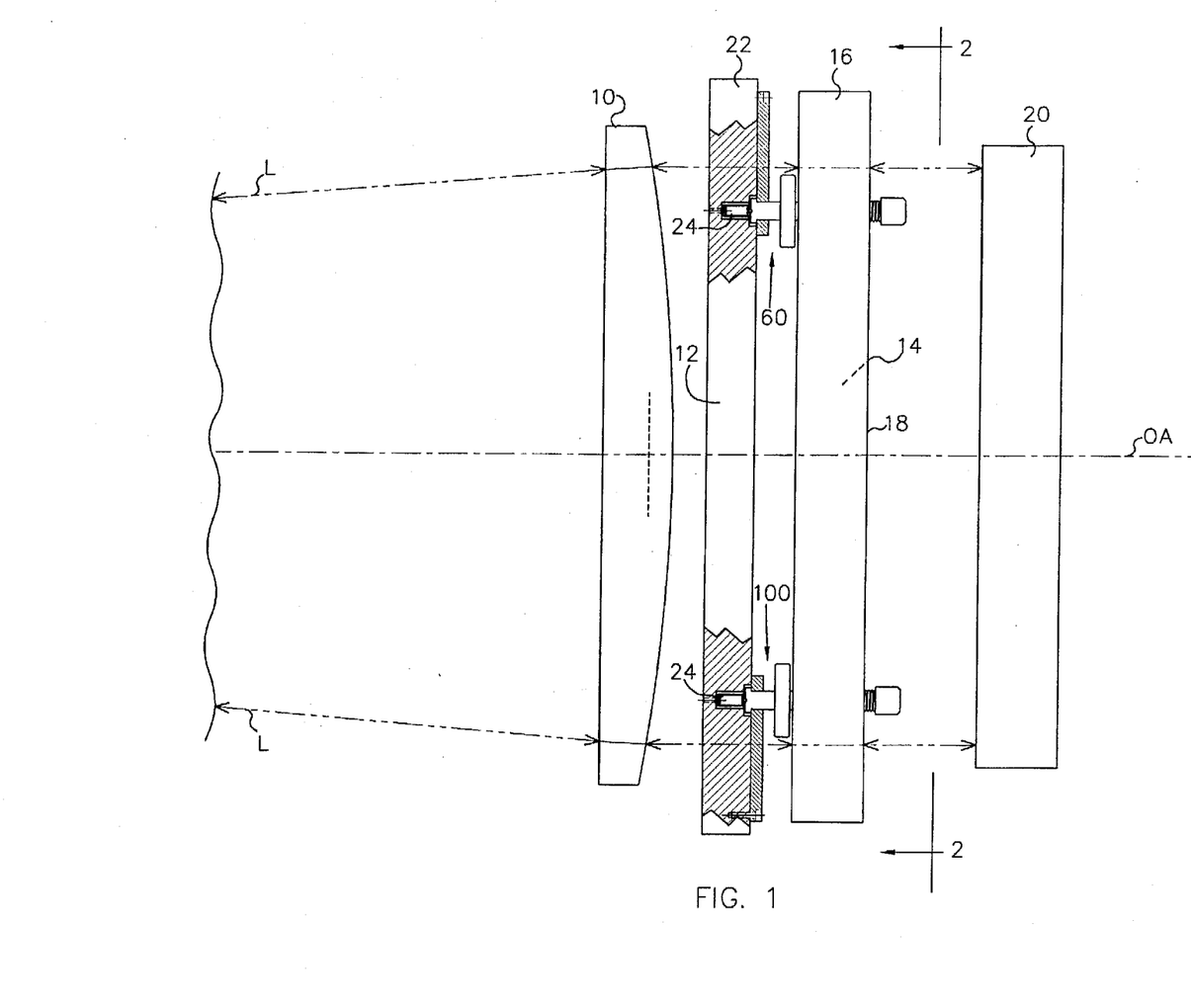
FIG. 1 is a simplified, partially-sectioned, schematic representation of the optical scanning assembly of a phase-shifting interferometer.

For the purpose of clarity of description, tip and tilt are defined herein as rotation around a horizontal and a vertical axis, respectively. Referring to the drawings, Wherein like parts are designated throughout with like numerals and symbols, FIG. 1 illustrates in schematic, partially cut-out view the scanning assembly and test surface portion of a phase-shifting interferometer according to the present invention. A beam of light L from a conventional light source (not shown) is projected along an optical axis OA through a lens 10 and an aperture 12 in a support structure toward a partially-reflective reference surface or transmission flat 14 mounted in a cell 16. A portion of the light L is reflected backwards from the transmission flat 14 (typically from the front surface 18) while another portion is transmitted toward a test surface 20, from which it is reflected back through the transmission flat and combined with the light reflected by the surface 18 to form an interference beam detected by a sensor in the interferometer portion of the instrument (not shown). The novel aspects of the invention lie in the way the cell 16 is coupled to the micromotion translators (PZT elements) of the instrument, which are mounted in the rigid support structure 22 surrounding the aperture 12. As further clarified by the front view of FIG. 2 (taken along line 2—2 in FIG. 1), the cell 16 and the transmission flat 14 rigidly encased within it are supported by two horizontal upper post assemblies 40 and 60 substantially parallel to each other and to the optical axis OA of the instrument. The vertical position of the upper post assemblies 40 and 60 is preferably the same, so as to provide a horizontal axis HA for rotation of the cell 16 to adjust its tip position with respect to the test surface 20. As those skilled in the art readily understand, it is desirable to keep the two surfaces in perfectly parallel relationship. A third, lower post assembly 100, also substantially parallel to the other assemblies and to the optical axis OA of the instrument, is preferably disposed in vertical alignment with one of the upper assemblies so as to provide a vertical axis VA for rotation of the cell 16 to further adjust its tilt position and seek perfect parallel alignment with the test surface 20. Each post assembly 40, 60, 100 is coupled to an individual PZT element 24 (FIG. 1) which exerts a longitudinal force on its corresponding post assembly and produces the translation of the transmission flat 14 (including the reference surface 18) along the optical axis OA during scanning.

Figure 2:
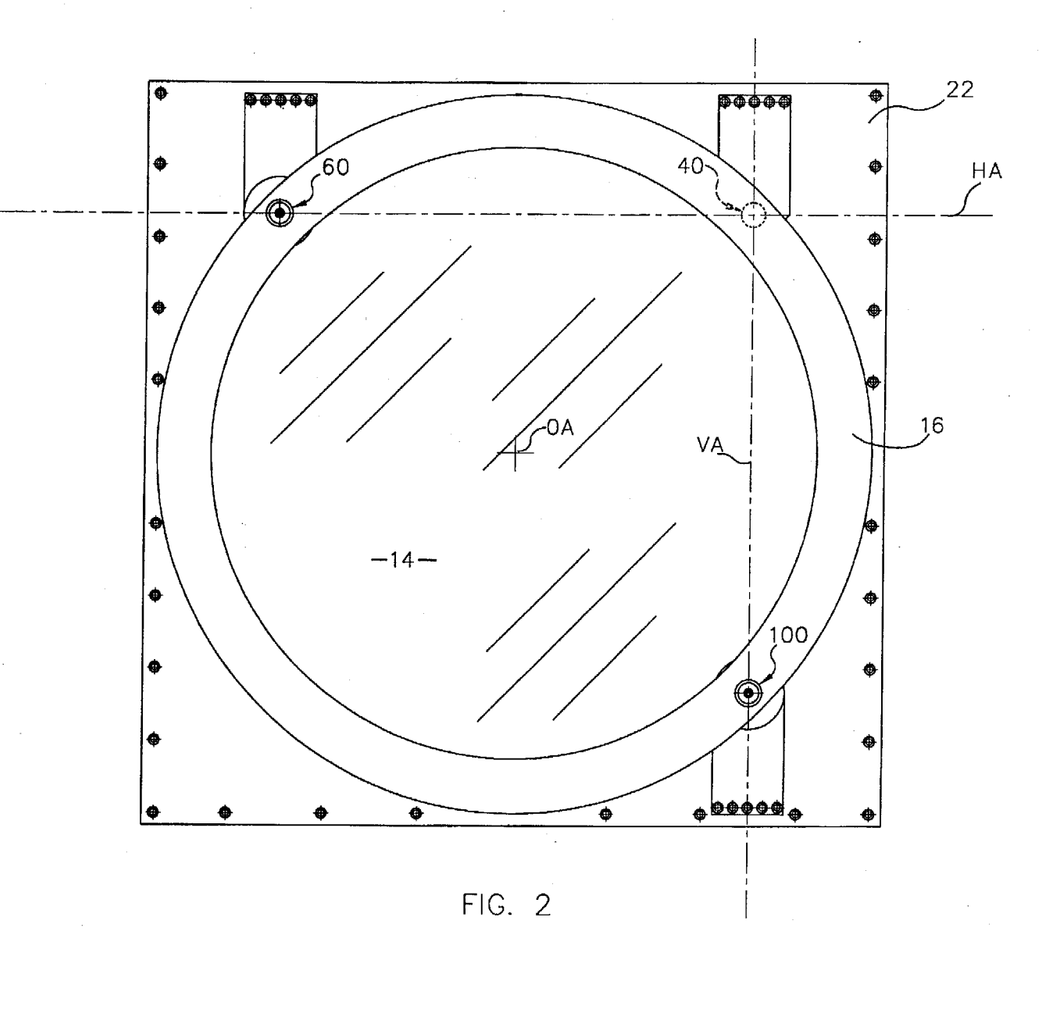
FIG. 2 is a front view of the transmission-flat cell and scanning assembly of the interferometer taken from line 2—2 in FIG. 1.
Figure 3:
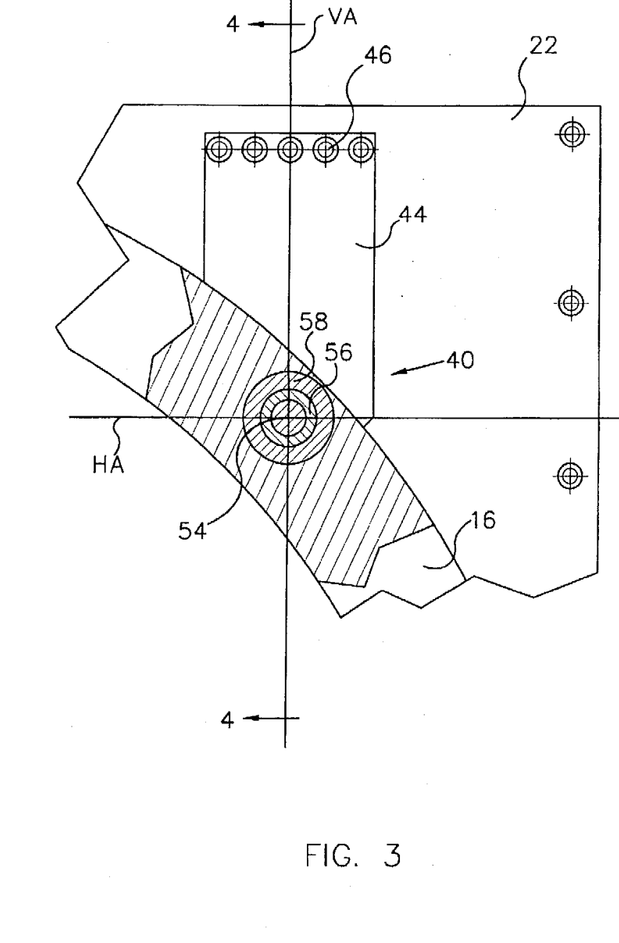
FIG. 3 is an enlarged, partial view of an upper support-post assembly providing a fixed pivot point for the reference surface so that it can be rotated about two orthogonal axes for tip/tilt adjustment.
Figure 4:
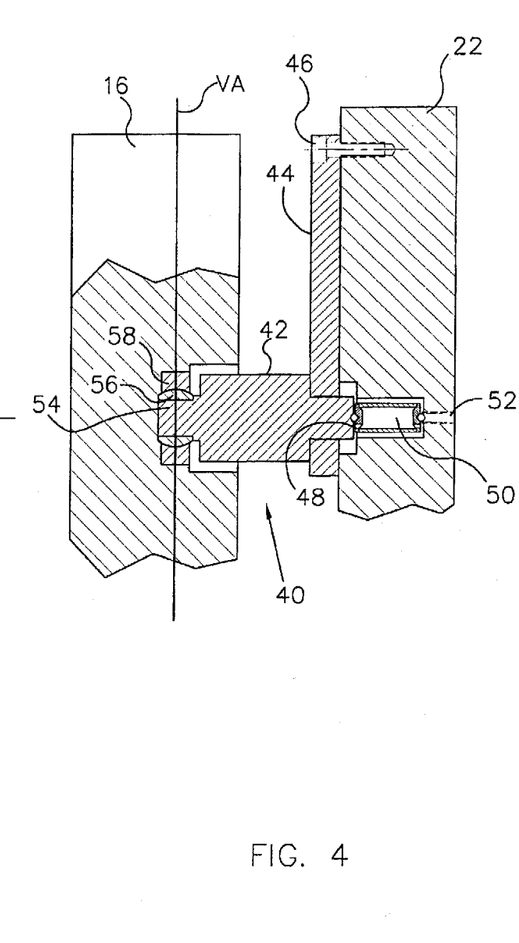
FIG. 4 is a sectional side view of FIG. 3 taken from line 4—4 in that figure.

Referring now to FIGS. 3-8, the details of each post assembly and the related flexure structure and scanning mechanism are illustrated. Partially sectioned FIG. 3 is an enlarged view of the post assembly 40 (as seen from the direction of FIG. 2) and FIG. 4 is a side view thereof taken from line 4—4 in FIG. 3 (which coincides with the vertical axis VA). The post assembly 40 comprises a post 42 rigidly mounted (such as by a threaded connection) through the lower end of a cantilever flexure 44, which in turn is fastened at the upper end (such as by threaded bolts 46) to the support structure 22 of the scanning assembly. The proximal end 48 of the post attached to the flexure 44 is coupled in conventional fashion (typically through a ball housed in two opposing conical seats) to a piezoelectric element 50 mounted in a receiving cavity in the support structure 22. A set screw 52 permits the setting of the PZT element 50 against the post 42 so as to achieve a desired predetermined tension. Thus, the vertical cantilever configuration of the flexure 44 causes the post 42 to be coupled to the PZT element in controlled pre-loaded arrangement. As the PZT element urges the longitudinal motion of the post 42 as a result of the application of a voltage, the flexure 44 provides a force in the opposite direction that minimizes distortions due to the relatively-large inertia of the moving parts (in particular, the inertia of the large optics carried by the post assembly).

The distal end 54 of the post 42 is pivotally connected to the support structure 22 by means of a spherical bearing 56 slidably coupled to a conforming race 58 that is firmly embedded in the cell 16. As a result of this coupling method, the post 42 is stably fixed in a horizontal position and able to move in a practically-perfect longitudinal direction (with respect to the optical axis OA of the instrument) as a result of the forces exerted by the PZT 50 in combination with the flexure 44. At the same time, the reference-mirror cell 16 is rigidly supported by the distal end 54 of the post 42 but is free to rotate through the spherical bearing 56 around both axes HA and VA, the intersection of which within the spherical bearing 56 provides a pivot point for tip/tilt adjustment of the reference mirror 14. Because of the tight connection between the post 42 and the race 58, the weight of the cell 16 (and the transmission flat 14 encased in it) is firmly supported both vertically and laterally by the post 42, so that the only motion possible is rotational (around axes HA and VA) and longitudinal (through the action of PZT element 50 in rigid connection with the post 42).

Figure 5:
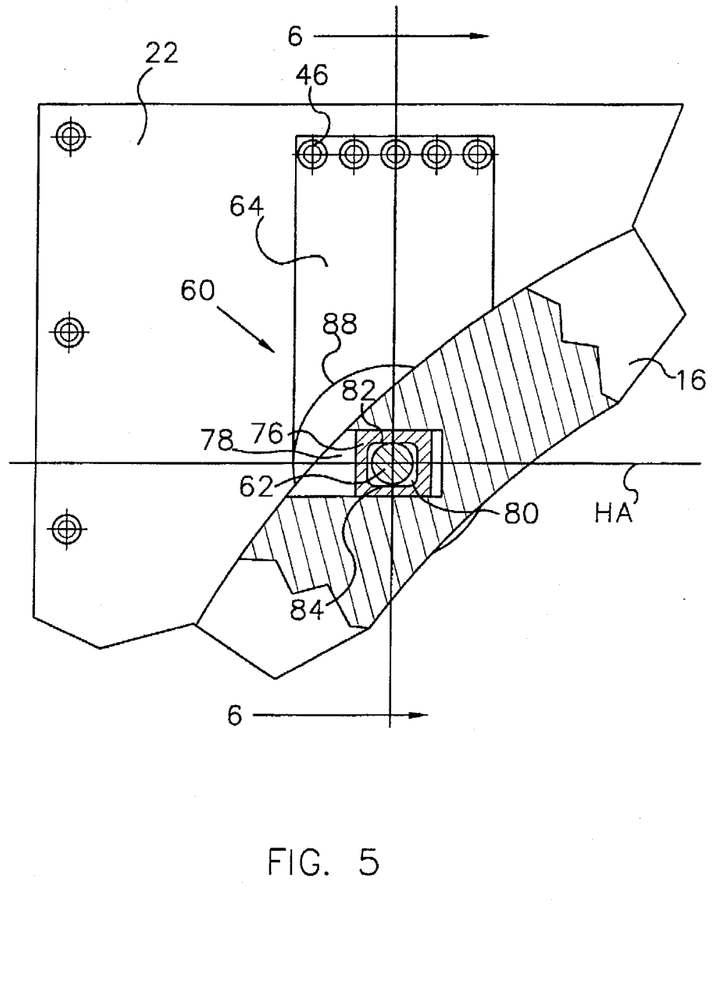
FIG. 5 is an enlarged, partial view of another upper support-post assembly providing a pivot point along a horizontal axis aligned with the fixed pivot point of the support-post assembly of FIG. 3, so that the reference surface can be rotated about such horizontal axis for tip adjustment.
Figure 6:
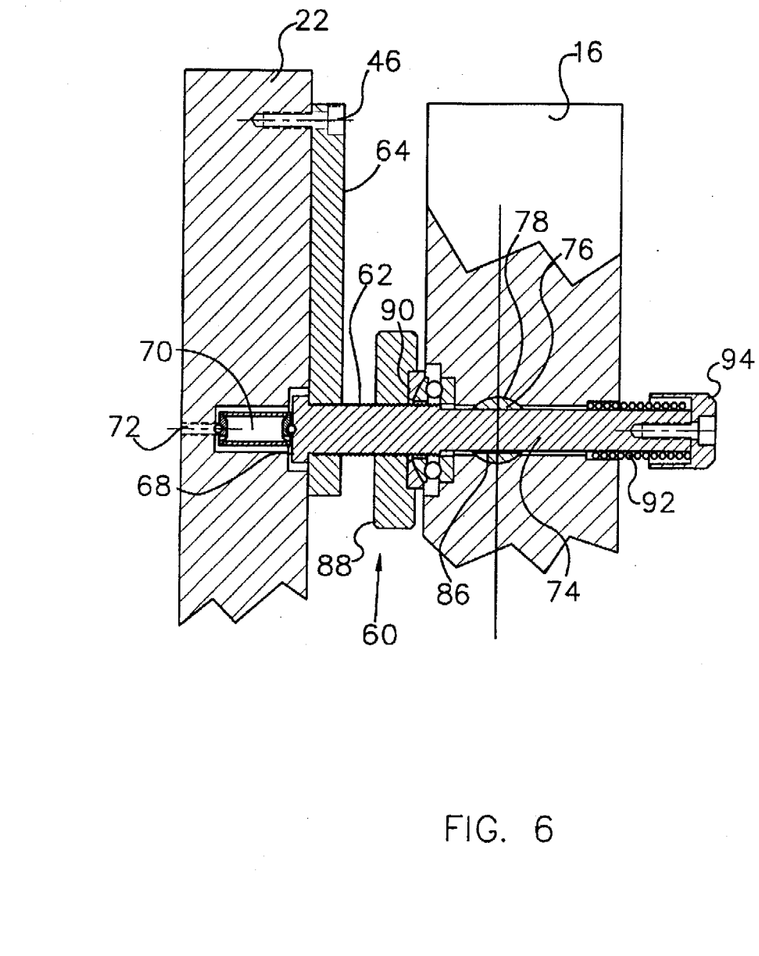
FIG. 6 is a sectional side view of FIG. 5 taken from line 6—6 in that figure.

Referring to the second upper post assembly, FIG. 5 illustrates a partially-sectioned, enlarged view of the post assembly 60 and FIG. 6 is a side view thereof taken from line 6—6 in FIG. 5. Note that the assembly 60 is aligned with the horizontal axis HA passing through the fixed pivot point within the spherical bearing 56. The post assembly 60 also comprises a post 62 rigidly mounted on (and through) the lower end of a cantilever flexure 64, which is anchored at the upper end to the support structure 22 of the scanning assembly. The proximal end 68 of the post attached to the vertical flexure 64 is also coupled in conventional fashion (preferably the same way as in the other upper post assembly) to a piezoelectric element 70 mounted in a corresponding receiving cavity in the support structure 22. A set screw 72 also permits the setting of the PZT element 70 against the post 62 so as to achieve a desired predetermined tension. Thus, the cantilever configuration of the flexure 64 causes the post 62 to also be coupled to the PZT element 70 in controlled pre-loaded arrangement. As in the case of the other upper post assembly, as the PZT element urges the longitudinal motion of the post 62 as a result of the application of a voltage, the flexure 64 provides a force in the opposite direction that minimizes inertial effects.

The distal portion 74 of the post 62 is also pivotally connected to the cell 16, but by means of a cylindrical bearing 76 slidably coupled to a conforming cavity 78 in the cell 16. The post 62 is inserted through a horizontal bore 80 in the bearing 76 and supports the bearing in alignment with the horizontal axis HA. The bore 80 is greater than the cross-section of the post 62, has a flat upper surface 82 in contact with the bearing 76, and a lower surface 84 preferably separated from the bearing by a gap 86. Thus, the cylindrical bearing 76 (and the portion of the cell 16 slidably connected to it) hangs from the post 62 and is able to slide with respect to the post as necessary to accommodate longitudinal motion of the cell 16 during tilt adjustments. The longitudinal position of the bearing 76 (and the cell 16 slidably attached to it) with respect to the post 62 is fixed by a threaded, rotatable adjustment knob 88 pushing the back side of the cell 16 forward through a thrust bearing 90 against a compression spring 92 urging the front side of the cell backwards. A rotatable cap 94 is provided for adjusting the tension of the spring 92. As a result of this coupling method, the post 62 is also stably fixed in a horizontal position and able to move in a practically-perfect longitudinal direction as a result of the forces exerted by the PZT 70 in combination with the flexure 64. The reference mirror cell 16 is thus rigidly supported by the distal portion 74 of the post 62 but is free to rotate through the cylindrical bearing 76 around the horizontal axis HA, thereby providing a pivot point for tip adjustment of the transmission flat 14. The weight of the cell 16 (and the transmission flat 14 encased in it) is solidly supported vertically and longitudinally by the post 62, so that the only motion possible is rotational (around axis HA) and longitudinal (through the action of PZT element 70 and its rigid connection with the post 62).

Figure 7:
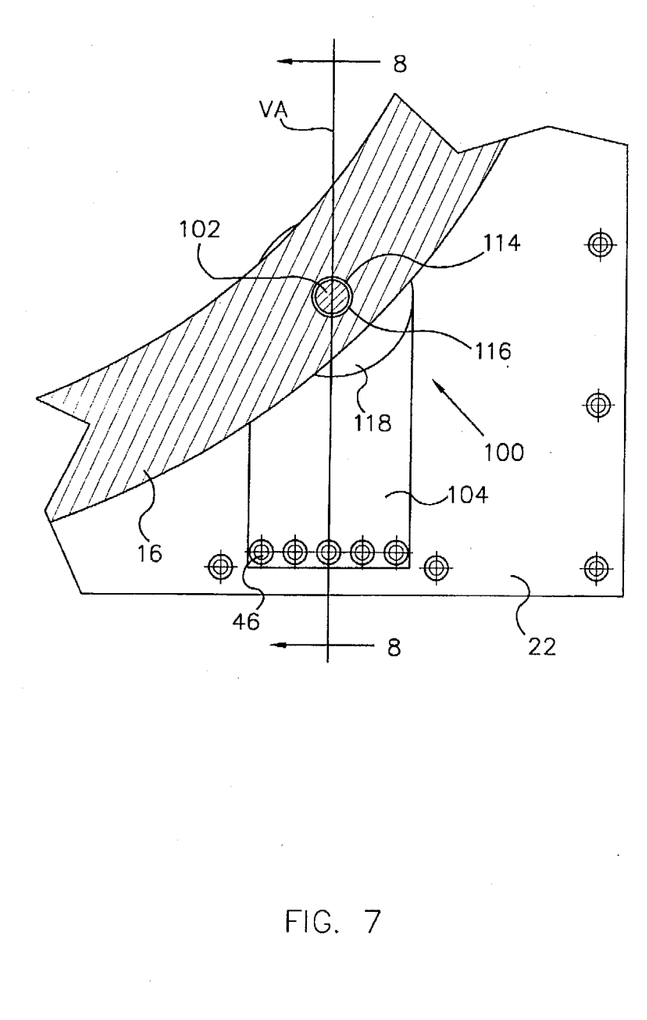
FIG. 7 is an enlarged, partial view of a lower support-post assembly providing a pivot point along a vertical axis aligned with the fixed pivot point of the upper support-post assembly of FIG. 3, so that the reference surface can be rotated about such vertical axis for tilt adjustment.
Figure 8:
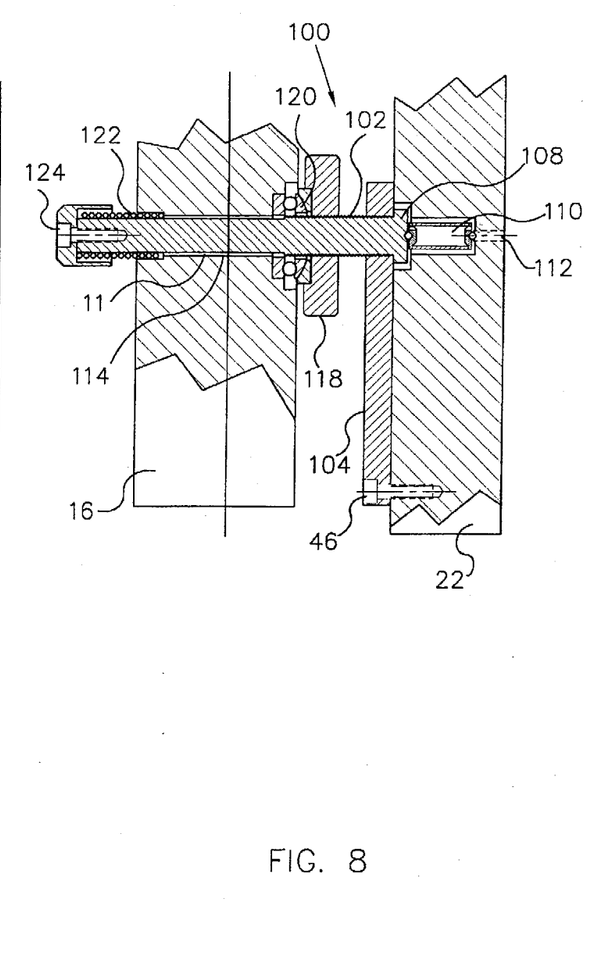
FIG. 8 is a sectional side view of FIG. 8 taken from line 8—8 in that figure.

Referring now to the third, lower post assembly, FIG. 7 illustrates a partially-sectioned, enlarged view of the post assembly 100 and FIG. 8 is a side view thereof taken from line 8—8 in FIG. 7 (which coincides with the vertical axis VA). The assembly 100 is aligned with the vertical axis VA, which passes through the fixed pivot point within the spherical bearing 56 in the upper post assembly 40. The post assembly 100 also comprises a post 102 rigidly mounted on (and through) the upper end of a third vertical cantilever flexure 104, which is anchored at the lower end to the support structure 22 of the scanning assembly. The proximal end 108 of the post attached to the flexure 104 is also coupled in conventional fashion (again, preferably the same way as in the other upper post assemblies) to a piezoelectric element 110 mounted in a corresponding receiving cavity in the support structure 22. A set screw 112 also permits the setting of the PZT element 110 against the post 102 so as to achieve a desired predetermined tension. Thus, the vertical cantilever configuration of the flexure 104 causes the post 102 to also be coupled to the PZT element 110 in controlled pre-loaded arrangement. As in the case of the two upper post assemblies, when the PZT element 110 urges the longitudinal motion of the post 102 as a result of the application of a voltage, the flexure 104 provides a force in the opposite direction that minimizes inertial effects.

The distal portion 114 of the post 102 is connected to the cell 16 only by means of a thrust-bearing/compression-spring arrangement similar to the one described for the upper post assembly 60. The post 102 is inserted through a longitudinal bore 114 in the cell 16, but it provides no vertical or lateral support to the cell. The bore 102 is greater than the cross-section of the post 102 and a gap 116 separates the post from the cell throughout the length of the bore 114. Thus, the post 102 bears none of the weight of the cell 16, which hangs only from the upper post assemblies 40 and 60; at the same time, because of the gap 114 the cell 16 is free to move laterally in any direction with respect to the post 102, as necessary to accommodate the longitudinal and/or angular motion of the cell during tip/tilt adjustments.

As for the upper post assembly 60, the longitudinal position of the cell 16 with respect to the post 102 is set by a threaded, rotatable adjustment knob 118 pushing the back side of the cell 16 forward through a thrust bearing 120 against a spring 122 urging the front side of the cell backwards. A rotatable cap 124 is provided for adjusting the tension of the spring 122. Again, as a result of this coupling method, the post 102 is stably fixed in a horizontal position and able to move in a practically-perfect longitudinal direction under the forces exerted by the PZT 110 in combination with the flexure 114. The reference mirror cell 16 is thus free to rotate through the gap 116 around the vertical axis VA, thereby providing a pivot point for tilt adjustment of the reference mirror 14. None of the weight of the cell 16 (and the transmission flat 14 encased in it) is supported by the post 102; therefore, the cell is free to move rotationally (around axis VA) and longitudinally (through the action of PZT element 110 and its rigid connection with the post 102).

As clearly illustrated by FIGS. 1 and 2, the combination of the three support-post assemblies 40, 60, 100, each with its individual connection to the transmission-flat cell 16, provides an efficient and precise mechanism for adjusting the tip/tilt of the reference mirror 14 and for translating it during phase-shift scanning. In operation, the adjustment knob 88 is turned to adjust the tilt of the reference mirror 14 by rotating it around the vertical axis VA, and the knob 118 is similarly used to adjust its tip by rotation around the horizontal axis HA. Because of the orthogonal relationship of the two axes of rotation and the fixed location of their point of intersection, the tip/tilt adjustment can be achieved with only two adjustment knobs. Note that the three points of support for the cell 16 are shown in horizontal and vertical alignment in the figures (which is preferred), but any position that would retain the orthogonality of the two axes of rotation would be equivalent for the purposes of tip/tilt adjustment. In addition, because of the vertical position of the cantilever flexures and because of the forces resulting from the weight distribution of the reference-surface cell over the flexures, each flexure is always in a compressed state, which produces uniform dynamic responses and minimizes deformations and/or vibrations.

The reference-mirror support configuration described in this disclosure has been found to greatly improve the linearity of motion and the tip/tilt stability of large-optics scanning assemblies during the performance of phase-shifting measurements. By properly setting the tension of the springs 92 and 122, the inertia of the cell 16 during scanning can be effectively neutralized to virtually eliminate vibrations and tip/tilt variations.

Figure 9:
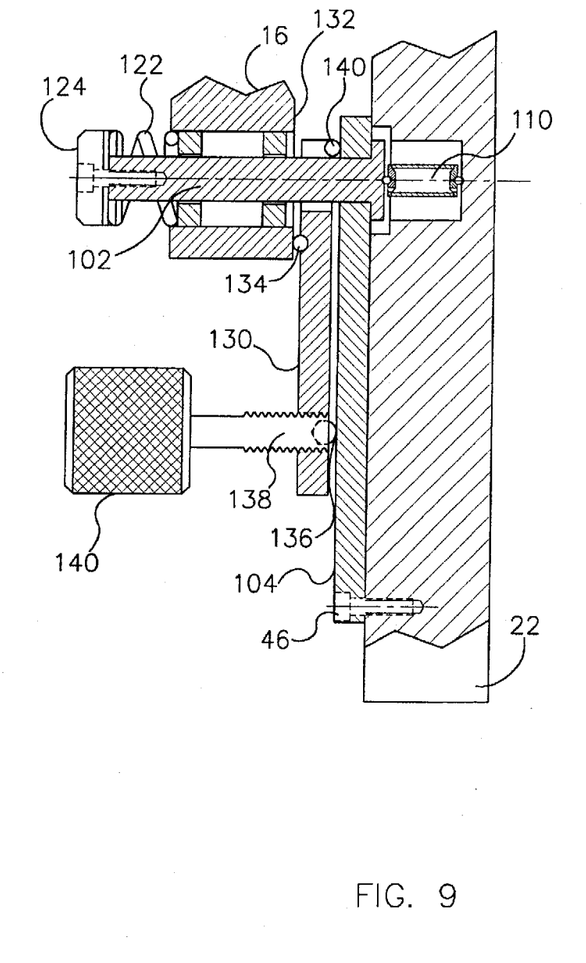
FIG. 9 is a view of another embodiment of the principles of the invention illustrated as a variation of the lower support-post assembly of FIG. 7.

In an equivalent embodiment of the invention shown in FIG. 9, the adjustment knob 118 is replaced with an adjustment lever 130 pivotally mounted between the flexure 104 and the back side 132 of the cell 16. A load ball 134 is used to set the position of the cell 16 against the spring 122 by exerting leverage through the tip 136 of the screw 138 threaded through the lever 130. A pair of suitably aligned balls 140 (only one shown) provide the necessary fulcrum for the adjustment lever 130, so that the force exerted by the load ball 134 varies as the screw 138 is rotated through the knob 140. Obviously, a similar arrangement would be used for the upper support-post assembly 60.

Various changes in the details, steps and components that have been described may be made by those skilled in the art within the principles and scope of the invention herein illustrated and defined in the appended claims. For example, the preferred embodiment of the invention is based on two bearing upper posts and one nonbearing lower post, but this configuration could be modified with equivalent results so long as the orthogonality between pairs of posts is maintained and the flexures are kept in vertical position to avoid torsional components resulting from the weight of the optics on the bearing posts. Thus, the post assemblies could be rotated by any amount and still be able to retain the features of the invention. Similarly, the invention could be practiced with the same advantages with respect to uniform force distribution during translation even if the post assemblies are not arranged in rectangular fashion; in such arrangement, though, three adjustment mechanisms (one associated with each post) would be required to set the tip/tilt of the optics.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. In an interferometric device scanning a large optical surface aligned with an optical axis thereof, a scanning mechanism comprising:
   (a) a rigid support structure aligned with said optical axis of the device;
   (b) a plurality of support-post assemblies coupled to said rigid support structure, each assembly comprising a flexure attached to the support structure and rigidly coupled to a proximal end of a post substantially parallel to said optical axis of the device; and
   (c) a micromotion actuator connected to each said post in substantial axial alignment therewith;
   wherein said optical surface is coupled to each said post in fixed axial relation for joint translation along said optical axis during scanning of the mechanism.

2. The device of claim 1, wherein said plurality of support-post assemblies consists of two upper support-post assemblies and one lower support-post assembly.

3. The device of claim 1, wherein said flexure consists of a cantilever having a first end attached to said support structure and a second end rigidly coupled to said proximal end of said post substantially parallel to the optical axis of the device.

4. The device of claim 2, wherein said flexure consists of a cantilever having a first end attached to said support structure and a second end rigidly coupled to said proximal end of said post substantially parallel to the optical axis of the device.

5. The device of claim 3, wherein said flexure is disposed substantially vertically between said support structure and said post.

6. The device of claim 4, wherein said flexure is disposed substantially vertically between said support structure and said post.

7. The device of claim 2, wherein said optical surface is coupled to each post of said upper support-post assemblies in suspended relation therewith, and wherein said optical surface is coupled to the post of said lower support-post in nonbearing relation therewith.

8. The device of claim 2, wherein said upper support-post assemblies are disposed along a first axis and said lower support-post assembly and one of said upper support-post assemblies are disposed along a second axis, and wherein said first axis and second axis are orthogonal to one another.

9. The device of claim 7, wherein said upper support-post assemblies are disposed along a horizontal axis, and said lower support-post assembly and one of said upper support-post assemblies are disposed along a vertical axis, such that said horizontal axis and vertical axis are orthogonal to one another.

10. The device of claim 1, further comprising means for adjusting a position of said optical surface in relation to a predetermined neutral position.

11. The device of claim 10, wherein said adjusting means consists of a rotatable threaded nut coupled to each post and urging said optical surface against a compression spring.

12. The device of claim 11, further comprising tensioning means for varying a tension of said compression spring.

13. The device of claim 12, wherein said tensioning means consists of a rotatable retaining cap screwably coupled to said post and urging said compression spring against said optical surface.

14. The device of claim 6, wherein said optical surface is coupled to each post of said upper support-post assemblies in suspended relation therewith, and wherein said optical surface is coupled to the post of said lower support-post in nonbearing relation therewith.

15. The device of claim 14, wherein said upper support-post assemblies are disposed along a horizontal axis, and said lower support-post assembly and one of said upper support-post assemblies are disposed along a vertical axis, such that said horizontal axis and vertical axis are orthogonal to one another.

16. The device of claim 15, further comprising means for adjusting a position of said optical surface in relation to a predetermined neutral position.

17. The device of claim 16, wherein said adjusting means consists of a rotatable threaded nut coupled to each post and urging said optical surface against a compression spring secured along a distal end of said post.

18. The device of claim 17, further comprising tensioning means for varying a tension of said compression spring.

19. The device of claim 18, wherein said tensioning means consists of a rotatable retaining cap screwably coupled to said distal end of the post and urging said compression spring against said optical surface.

20. In an interferometric device scanning a large optical surface aligned with an optical axis thereof, a scanning mechanism comprising:
(a) a rigid support structure aligned with said optical axis of the device;
(b) a plurality of support means coupled to said rigid support structure for supporting said optical surface, said plurality comprising upper support means and lower support means; and
(c) micromotion-actuator means connected to said plurality of support means for translating said optical surface substantially in alignment with said optical axis;
wherein said optical surface is either coupled to said upper support means in suspended relation therewith and to said lower support means in nonbearing relation therewith or is coupled to said lower support means in bearing relation therewith and to said upper support means in nonbearing relation therewith.

21. The device of claim 20, further comprising means for adjusting a position of said optical surface in relation to a predetermined neutral position.

22. The device of claim 20, wherein said plurality of support means consists of two suspended upper support means and one nonbearing lower support means.

23. The device of claim 22, wherein said upper support means are disposed along a first axis and said lower support means and one of said upper support means are disposed along a second axis, and wherein said first axis and second axis are orthogonal to one another.

24. The device of claim 22, wherein said upper support means are disposed along a horizontal axis, and said lower support means and one of said upper support means are disposed along a vertical axis, such that said horizontal axis and vertical axis are orthogonal to one another.

25. The device of claim 24, further comprising means for adjusting a position of said optical surface in relation to a predetermined neutral position.

26. The device of claim 24, wherein each of said support means comprises a flexure attached to the support structure and rigidly coupled to a proximal end of a post substantially parallel to said optical axis of the device.

27. The device of claim 26, wherein said flexure consists of a cantilever having a first end attached to said support structure and a second end rigidly coupled to said proximal end of said post substantially parallel to the optical axis of the device.

28. The device of claim 27, wherein said flexure is disposed substantially vertically between said support structure and said post.

29. The device of claim 28, further comprising means for adjusting a position of said optical surface in relation to a predetermined neutral position.

30. The device of claim 29, wherein said adjusting means consists of a rotatable threaded nut coupled to each post and urging said optical surface against a compression spring.

31. The device of claim 30, further comprising tensioning means for varying a tension of said compression spring.

32. The device of claim 31, wherein said tensioning means consists of a rotatable retaining cap screwably coupled to said post and urging said compression spring against said optical surface.

33. In an interferometric device scanning a large optical surface aligned with an optical axis thereof, a scanning mechanism comprising:
(a) a rigid support structure aligned with said optical axis of the device;
(b) a plurality of independent support means for supporting said optical surface;
(c) independent flexure means coupled to said rigid support structure and to each of said independent support means; and
(d) micromotion-actuator means connected to each of said plurality of support means for independent translation of said optical surface substantially in alignment with said optical axis.

* * * * *